Figure 1:
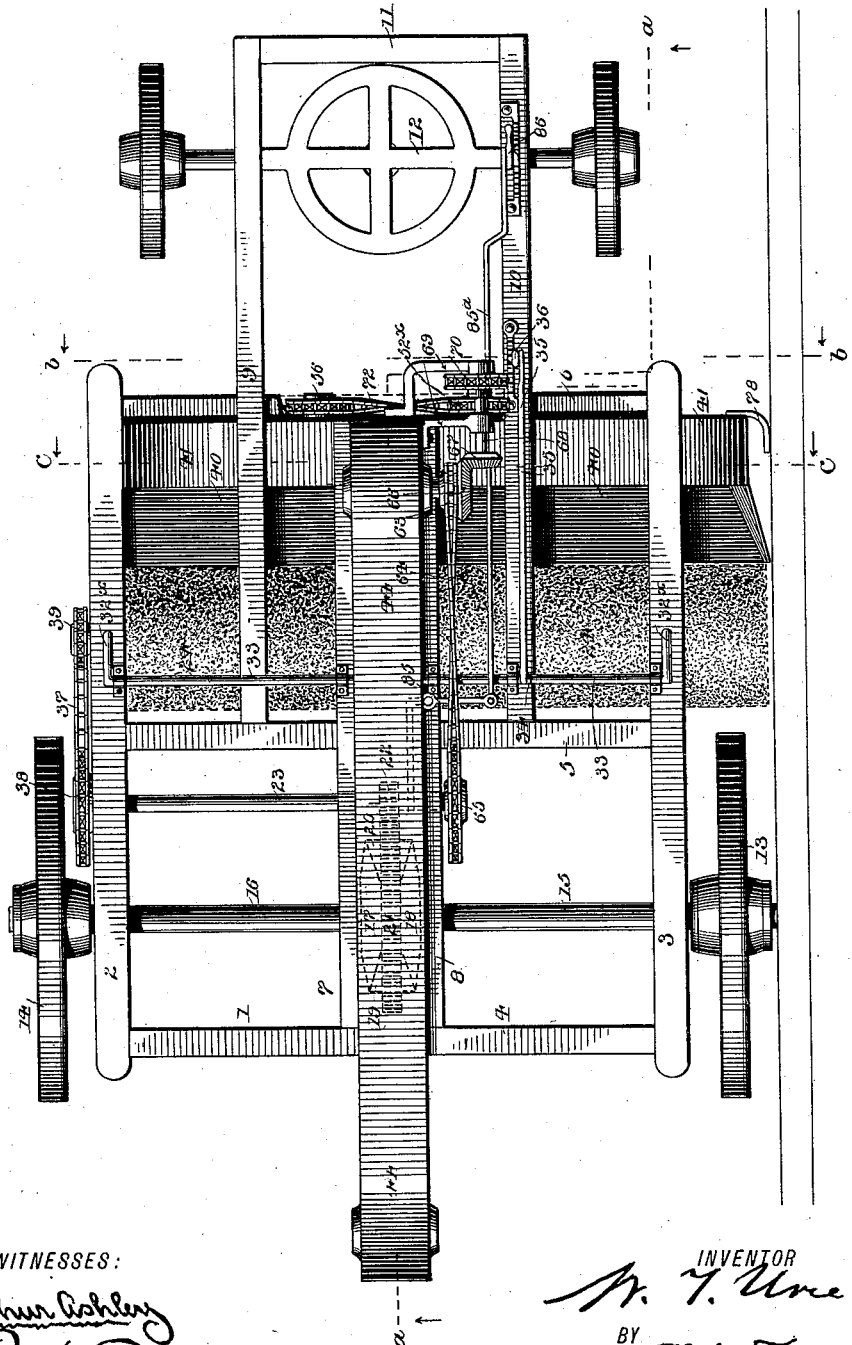

(No Model.)

W. T. URIE.
STREET SWEEPER.

No. 594,503. Patented Nov. 30, 1897.

WITNESSES:

INVENTOR

BY

ATTORNEY.

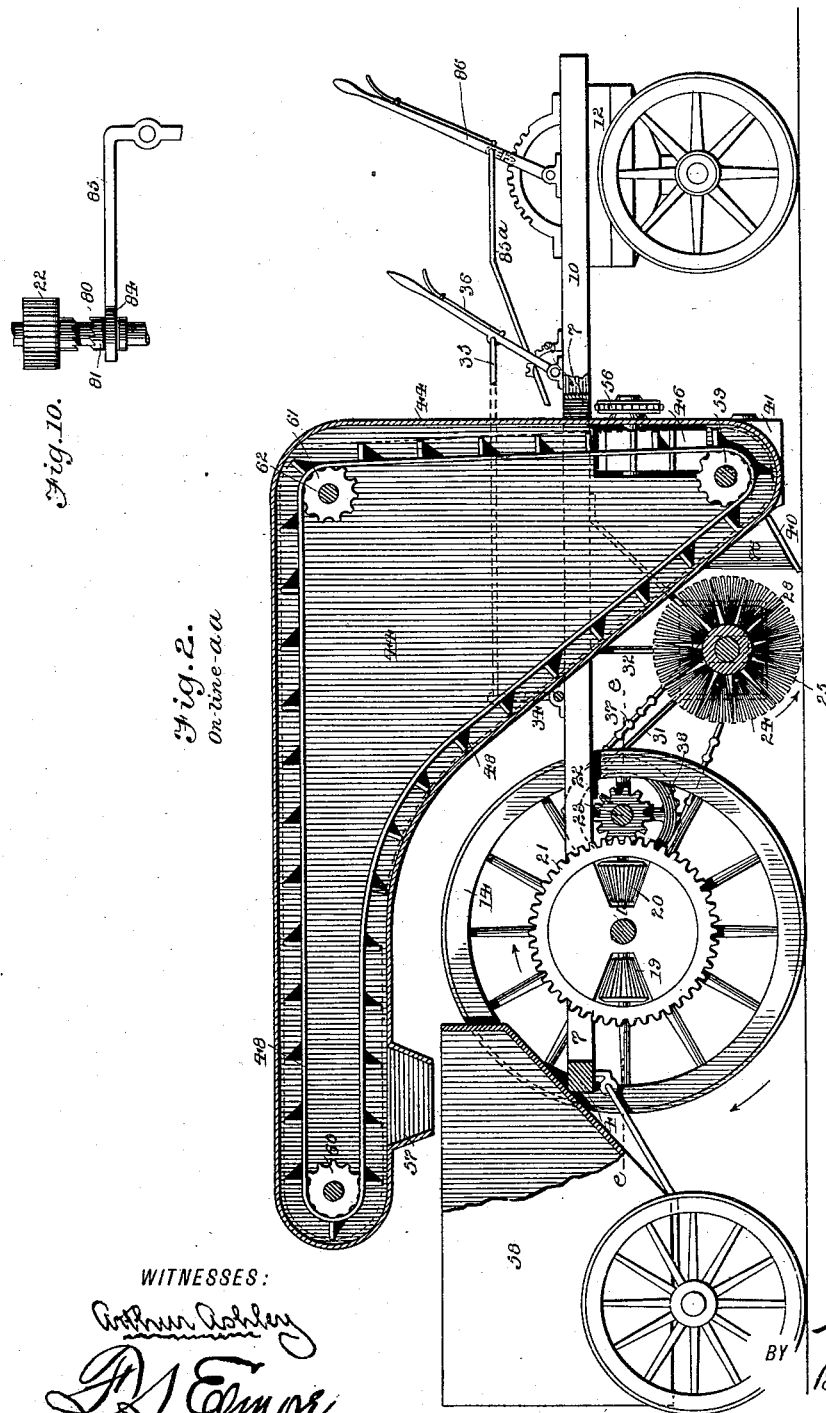

(No Model.) 4 Sheets—Sheet 3.
W. T. URIE.
STREET SWEEPER.
No. 594,503. Patented Nov. 30, 1897.
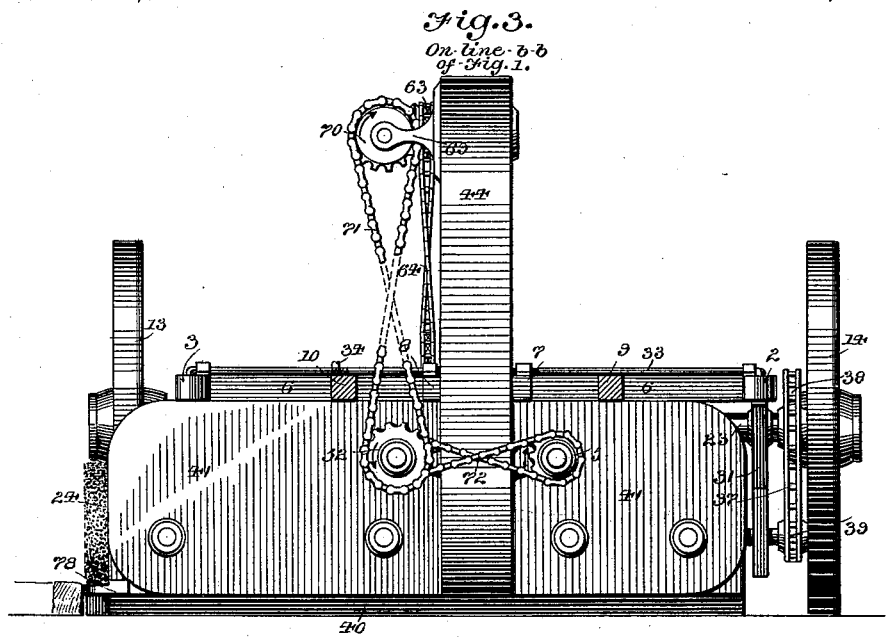
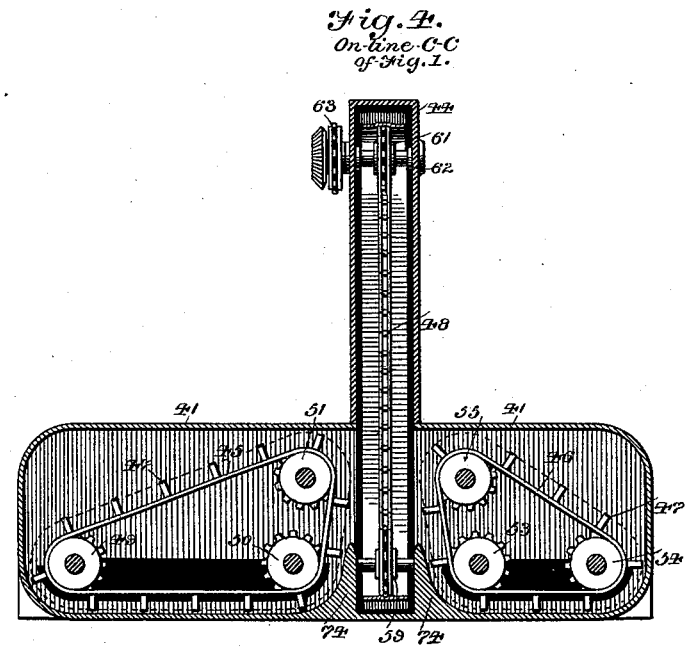
WITNESSES:
INVENTOR
BY
ATTORNEY.

(No Model.) 4 Sheets—Sheet 4.
W. T. URIE.
STREET SWEEPER.
No. 594,503. Patented Nov. 30, 1897.
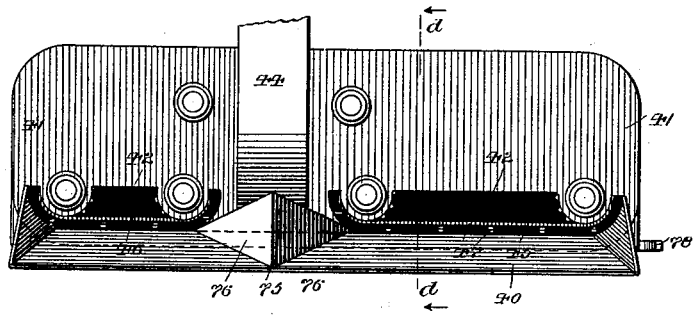
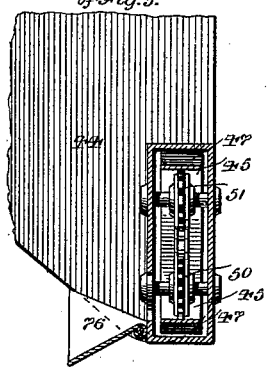
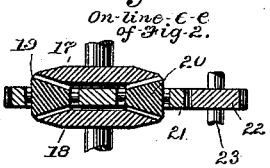
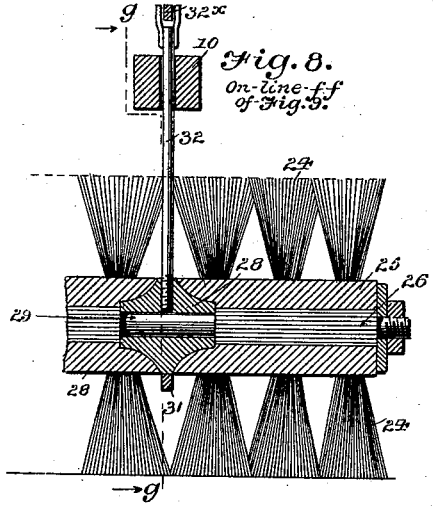
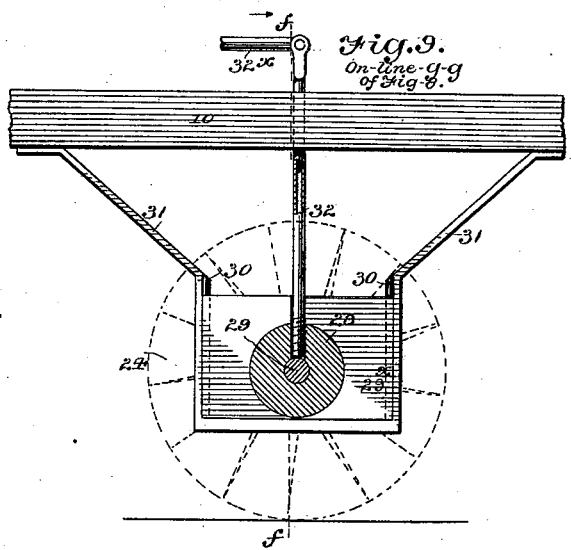
WITNESSES: INVENTOR

UNITED STATES PATENT OFFICE.

WILLIAM T. URIE, OF KANSAS CITY, MISSOURI.

STREET-SWEEPER.

SPECIFICATION forming part of Letters Patent No. 594,503, dated November 30, 1897.

Application filed December 15, 1896. Serial No. 615,780. (No model.)

*To all whom it may concern:*

Be it known that I, WILLIAM T. URIE, of Kansas City, county of Jackson, and State of Missouri, have invented a new and useful Improvement in Sweeping-Machines, of which the following is a specification.

This invention has reference to street-sweeping machines; and it consists in an improved mechanism comprising, in combination, laterally-acting endless conveyers arranged to receive the sweepings from a rotary brush and carry them to a longitudinally-acting conveyer by which the sweepings are delivered to a receptacle accompanying the machine.

The invention also consists in the details of construction and combination of parts hereinafter described and claimed.

In the accompanying drawings, Figure 1 is a top plan view of my improved street-sweeping machine, the receptacle for the sweepings being omitted. Fig. 2 is a longitudinal sectional elevation through the same on the line $a\,a$ of the preceding figure. Fig. 3 is a front sectional elevation on the line $b\,b$ of Fig. 1. Fig. 4 is a vertical transverse section on the line $c\,c$ of Fig. 1. Fig. 5 is a rear elevation of the lateral casing inclosing the endless conveyers, showing the divider to direct the sweepings to the conveyers. Fig. 6 is a vertical sectional elevation on the line $d\,d$ of Fig. 5. Fig. 7 is an enlarged sectional elevation on the line $e\,e$ of Fig. 2, showing the gearing by which the operative parts of the machine are driven from the ground-wheel. Fig. 8 is a section of one end of the brush and its bearing on the line $f\,f$ of Fig. 9. Fig. 9 is a sectional elevation through the parts shown in Fig. 8 on the line $g\,g$ of Fig. 8. Fig. 10 is a detail view of the clutch mechanism.

Referring to the drawings, 1 represents a frame comprising side timbers 2 and 3, connected by transverse bars 4, 5, and 6 and central longitudinal bars 7 and 8. From the bar 5 two parallel timbers 9 and 10 are extended forward beyond the front of the frame and have their forward ends connected by a bar 11. This extension of the frame is supported by a swiveling truck 12, to which the draft is applied, and the rear portion of the frame is supported by two ground-wheels 13 and 14, fixed to the outer ends of two axles or spindles 15 and 16, mounted in bearings on the under sides of the side bars 2 and 3 and central bars 7 and 8. The inner adjacent ends of the two axles are provided with bevel gear-wheels 17 and 18, which mesh with two bevel-pinions 19 and 20, journaled in a pinion 21, which is mounted between the two bevel-wheels and which engages and drives a pinion 22, mounted loosely on a transverse shaft 23, journaled in bearings in the frame, and by which the operative parts of the machine are driven through the medium of a clutch, as more fully described hereinafter. By the gear described the power from the two ground-wheels will be transmitted to the pinion 22, which is adapted to be clutched to the shaft 23, as more fully described hereinafter, to drive the operative parts of the machine, the ground-wheels being by this arrangement of gearing capable of a relative movement with respect to each other, so that in turning corners one of them may move faster than the other without in any manner interfering with the driving of the operative parts of the machine.

The machine is provided with a rotary brush 24, which extends transversely along the under side of the frame, near its forward end, and which consists of a spindle or sleeve 25, to which the tufts are fixed and which is mounted on a squared shaft 26. This squared shaft is formed near its opposite ends with cylindrical bearing-spindles 29, which are mounted loosely in collars 28, which collars are in turn seated in blocks 29$^\times$, mounted to move vertically in guides 30, sustained by brackets 31, depending from the under sides of the side bars of the frame. This construction will permit of the vertical movement of the brush-bearing in order to raise or lower the brush, as desired. To effect this movement of the brush, the collars 28 are tapped to receive the lower ends of vertical hollow rods 32, which are extended upward through the side bars of the frame above the same, where they are jointed to crank-arms 32$^\times$ on the ends of a transverse rock-shaft 33, mounted in bearings on the upper side of the frame and provided with an arm 34. The arm 34 is connected to the rear end of an operating-link 35, the forward end of which is jointed to a hand-lever 36, provided with a lockingdog arranged to engage the usual locking-teeth. By the construction described the movement of the hand-lever will raise and lower the rods 32 and elevate or depress the brush-bearings, as the case may be. By employing the hollow rods with their lower ends tapped into the collars 28 and communicating with the bearing-spindles the lubrication of these spindles may be conveniently effected by introducing the lubricant into the upper ends of these rods, whence it will flow downward to the bearing.

The brush receives motion from the shaft 23 through a chain 37, which passes around a sprocket-wheel 38 on one end of the shaft and a sprocket-wheel 39 on the end of the brush-shaft, and as the machine moves forward the brush will be rotated in the direction indicated by the arrow in Fig. 2 and will throw the sweepings over an apron 40, connected at its front edge to the rear lower edge of a transverse casing 41, which is sustained at the front of the frame, at the under side of the same. This casing is closed on all sides except at its rear lower edge, at which point the sweepings from the brush enter the same, as at 42, Fig. 5. The casing communicates with a longitudinally-extending casing 44, fixed between the two center bars 7 and 8 of the frame and extending rearward to the rear of the frame. The transverse casing is provided on opposite sides of this central casing with two endless conveyers 45 and 46 in the form of endless belts, provided at intervals with scraping-fingers 47, adapted to move along the bottom of the casing toward each other and carry the sweepings delivered to the casing to the central longitudinal casing and the central conveyer 48, located therein. The conveyer 45 passes around two idler sprocket-wheels 49 and 50, mounted in bearings between the walls of the casing, and around an upper sprocket-wheel 51, mounted on a shaft which extends through the casing to the outside, where it is provided with a sprocket-wheel 52, by which the belt is driven, as more fully described hereinafter. The other conveyer-belt 46 is similarly mounted in the opposite side of the casing on two lower sprocket-wheels 53 and 54, located within the casing, and an upper wheel 55, whose shaft is extended to the outside of the casing, where it is provided with a sprocket-wheel 56, by which it is driven.

The conveyer 48 of the central casing is similar in form to those just described and its scraping-fingers are adapted to move along the bottom of the casing, which inclines upward and rearward to the rear portion of the frame and overhangs the same, and at this point it is provided with a discharge-opening 57, through which the sweepings are discharged to a receptacle 58, adapted to be coupled to the frame, as shown. This conveyer-belt passes over an idler sprocket-wheel 59 in the lower front portion of the casing, a second idler-wheel 60 at the rear overhanging end of the casing, and a drive-wheel 61 at the upper front portion of the casing. This latter wheel is mounted on a shaft 62, which is extended through the casing to the outside, where it is provided with a sprocket-wheel 63, which is driven by a chain 64 from a sprocket-wheel 65 on the end of the shaft 23 opposite to the sprocket-wheel 38 before mentioned as driving the brush. The wheel 63 has fixed to it a bevel-gear 66, which meshes with a bevel-gear 67 on the rear end of a longitudinal shaft 68, mounted in bearings 69, fixed to the central casing. This shaft has fixed to it a sprocket-wheel 70, which is connected by a chain 71 to the sprocket-wheel 52, before alluded to, and this sprocket-wheel has fixed to it a sprocket-wheel $52^\times$, which is in turn connected to the wheel 56 by a chain 72.

By the gearing described when the machine is moved forward the brush is rotated and the two transverse conveyers will be moved at their lower sides inward toward each other and the central conveyer will be moved rearward at its lower side. The sweepings delivered to the side conveyers will as a result of these motions be carried to the central conveyer, and by it they will be carried upward and discharged through the opening 57 into the accompanying receptacle. This receptacle after being filled may be conveniently replaced by another one without in any manner interfering with the progress or operation of the machine. Where the side casings communicate with the central casing, the bottom of the former is curved upward, as at 74, which will insure the certain delivery of the sweepings to the central casing and effectually prevent their escape to the ground.

The apron 40 at a point opposite the central conveyer is provided with a divider 75, as shown more particularly in Fig. 5, which divider consists of two vertical plates or shields 76, diverging from the rear edge of the apron adjacent to the face of the brush forward beyond the side of the longitudinal casing. These shields serve to direct the sweepings from the central portion of the brush laterally from the longitudinal casing to the transverse conveyers, and in this way insure the delivery of all the sweepings to the conveyers.

As shown in Fig. 1, the brush is extended at one side beyond the frame and the ground-wheel in order to sweep close up against the curb, and to insure the movement of the machine in a straight line along the curb I provide a guard-finger 78, which is fixed to the front of the transverse casing and which extends therefrom outward and rearward a short distance, as shown.

In order that the operation of the machine may be controlled by the attendant, I provide the shaft 23 with a clutch 80 in the form of a sliding collar 81, splined to the shaft 23 and provided with a toothed edge adapted to engage corresponding teeth on the pinion 22, which is mounted loosely on the shaft. This collar is engaged by fork 84 on the end of an elbow-lever 85, pivoted to the frame-bar 8 and having connected to its end a forwardly-extending operating-rod 85ª, connected to a hand-lever 86.

Having thus described my invention, what I claim is—

1. In a sweeping-machine, the combination with the frame, of the transverse casing sustained at its forward end and provided at its base with a horizontal opening through which the sweepings are directed, two transverse belts mounted in said casing and provided with scrapers arranged to act along the bottom of the same, a horizontal rotary brush to deliver the sweepings through the opening in the casing onto its bottom, a longitudinal casing sustained by the frame communicating at its front sides with the transverse casing between the two belts and having its bottom extending rearwardly and upwardly, and an endless belt in said longitudinal casing provided with scrapers arranged to act rearwardly and upwardly along the bottom of the same on the sweepings delivered thereto by the transverse belts.

2. In a sweeping-machine the combination with the frame of the transverse casing sustained thereby and provided with an opening to receive the sweepings, conveyers in said casing arranged to carry the sweepings toward the center of the machine, a brush to deliver the sweepings to the conveyers a longitudinal casing communicating with the transverse casing and a divider intermediate of the brush and longitudinal casing and serving to direct the sweepings laterally in opposite directions from the longitudinal casing.

3. In a sweeping-machine the combination with a transverse casing provided with an opening and having its bottom curved upward between its ends, of conveyer-belts provided with scrapers arranged to act along the bottom of the same and the upwardly-curved portions, a longitudinal casing communicating with the transverse casing between the upwardly-curved portions and a conveyer in said longitudinal casing.

4. In a sweeping-machine, the combination with the frame of the vertically-movable brush-bearing, the brush mounted therein a vertical hollow rod connected to said bearing and communicating with the bearing-surface of the brush and means for raising and lowering said rod.

5. In a sweeping-machine, the combination with the frame, of the vertical guide sustained thereby, the bearing-block mounted in said guide, the bearing-collar sustained by said block, the brush-shaft mounted in said collar, the vertical hollow rod connected to the bearing-collar and communicating with the bearing-surface of the brush-shaft and means for raising and lowering said rod.

6. In a sweeping-machine the combination with the frame, of the transverse casing sustained thereby and provided with an opening at its base to receive the sweepings, two conveyers mounted in said casing and arranged to carry the sweepings toward the center of the same, a rotary brush for delivering the sweepings into the opening of said casing, an apron connected at its edge to the transverse casing, a longitudinal casing communicating with the transverse casing between the conveyers therein, a conveyer in said longitudinal casing and a divider sustained by the apron and comprising two diverging vertical shields to direct the sweepings from the central portion of the brush laterally to the two transverse conveyers.

In testimony whereof I hereunto set my hand, this 2d day of November, 1896, in the presence of two attesting witnesses.

WILLIAM T. URIE.

Witnesses:
B. C. URIE,
S. F. ROGERS.